United States Patent
Tello et al.

(10) Patent No.: US 7,471,591 B2
(45) Date of Patent: Dec. 30, 2008

(54) METHOD AND APPARATUS FOR AZIMUTHAL LOGGING OF SHEAR WAVES IN BOREHOLES USING OPTIONALLY ROTATABLE TRANSMITTER AND RECEIVER ASSEMBLIES

(75) Inventors: Lucio N. Tello, Benbrook, TX (US); Thomas J. Blankinship, Fort Worth, TX (US); Edwin K. Roberts, Fort Worth, TX (US); Marek Kozak, Newark, CA (US)

(73) Assignee: Precision Energy Services, Inc., Fort Worth, TX (US)

( * ) Notice: Subject to any disclaimer, the term of this patent is extended or adjusted under 35 U.S.C. 154(b) by 111 days.

(21) Appl. No.: 11/316,024

(22) Filed: Dec. 21, 2005

(65) Prior Publication Data

US 2007/0140055 A1   Jun. 21, 2007

(51) Int. Cl.
*G01V 1/00* (2006.01)
(52) U.S. Cl. .......................... 367/25; 367/31
(58) Field of Classification Search ............... 367/25, 367/31
See application file for complete search history.

(56) References Cited

U.S. PATENT DOCUMENTS

| | | | |
|---|---|---|---|
| 3,583,677 A | 6/1971 | Phillips | |
| 4,207,961 A | 6/1980 | Kitsunezaki | |
| 4,383,591 A | 5/1983 | Ogura | |
| 4,649,525 A | 3/1987 | Angona et al. | |
| 4,709,362 A | 11/1987 | Cole | |
| 4,713,968 A | 12/1987 | Yale | |
| 4,832,148 A | 5/1989 | Becker et al. | |
| 4,862,990 A | 9/1989 | Cole | |
| 4,874,061 A | 10/1989 | Cole | |
| 4,951,267 A | 8/1990 | Chang et al. | |
| 5,036,945 A | 8/1991 | Hoyle et al. | |
| 5,043,952 A | 8/1991 | Hoyle et al. | |
| 5,080,189 A | 1/1992 | Cole | |

(Continued)

FOREIGN PATENT DOCUMENTS

WO   WO0017672   3/2000

OTHER PUBLICATIONS

"Search Report udner Section 17" received in corresponding Application No. GB0619151.4 dated Jan. 15, 2007.

(Continued)

*Primary Examiner*—Mark Hellner
(74) *Attorney, Agent, or Firm*—Wong, Cabello, Lutsch, Rutherford & Brucculeri, LLP

(57) ABSTRACT

An acoustic logging system with a borehole tool comprising a transmitter assembly and an axially spaced receiver assembly. The transmitter and receiver assemblies are optionally rotatable with respect to each other, depending upon the embodiment of the logging system. The logging system is designed to measure, among other parameters, the velocity (or slowness) and amplitude of shear wave energy induced by the transmitter assembly within formation penetrated by the borehole. These parameters are extracted from full wave acoustic data responses of receiver elements comprising the receiver assembly, and are measured as a function of azimuth around the borehole. These parameters are subsequently used to determine anisotropic properties of the formation, such as the azimuthal direction of formation fracturing with respect to the well borehole. Optional rotation of the transmitter and receiver assemblies minimizes adverse effects of maintaining calibration and balance of multiple transmitters and receivers.

12 Claims, 3 Drawing Sheets

U.S. PATENT DOCUMENTS

| | | |
|---|---|---|
| 5,135,072 A | 8/1992 | Meynier |
| 5,159,578 A * | 10/1992 | Lenhardt et al. ............... 367/34 |
| 5,166,909 A | 11/1992 | Cole et al. |
| 5,168,470 A | 12/1992 | Dennis et al. |
| 5,266,845 A | 11/1993 | Sakaue |
| 5,357,481 A * | 10/1994 | Lester et al. .................. 367/31 |
| 5,402,392 A | 3/1995 | Lu et al. ....................... 367/75 |
| 5,477,101 A | 12/1995 | Ounadjeta |
| 5,712,829 A | 1/1998 | Tang et al. .................... 367/75 |
| 5,852,262 A | 12/1998 | Gill et al. |
| 6,102,152 A | 8/2000 | Masino et al. |
| 6,176,344 B1 | 1/2001 | Lester |
| 6,188,961 B1 | 2/2001 | Mandal ......................... 702/6 |
| 6,464,439 B1 | 10/2002 | Janitzki |
| 6,567,046 B2 | 5/2003 | Taylor et al. .......... 343/700 MS |
| 6,772,067 B2 | 8/2004 | Blanch et al. ................ 702/14 |
| 6,791,891 B1 * | 9/2004 | Peng et al. ................... 365/201 |
| 6,791,899 B2 | 9/2004 | Blanch et al. ................. 367/38 |
| 6,925,031 B2 * | 8/2005 | Kriegshauser et al. ........ 367/25 |
| 6,930,616 B2 | 8/2005 | Tang et al. ............... 340/854.4 |
| 2005/0226098 A1 * | 10/2005 | Engels et al. ................. 367/31 |

OTHER PUBLICATIONS

Sinha, Bikash K., Borehole Flexural Modes in Anisotropic Formations, Geophysics, vol. 59, No. 7 (Jul. 1994) p. 1037-1052.

Winbow, Graham A., Compressional and Shear Arrivals in a Multipole Sonic Log, Geophysics, vol. 50, No. 7 (Jul. 1985) p. 1119-1126).

Zemanek, J., Continuous Acoustic Shear Wave Logging, SPWLA 25th Annual Loggoing Symposium, Jun. 10-13, 1984, pp. 1-14.

Kimball, Christoppher V., Semblance Processing of Borehole Acoustic Array Data, Geophysics, vol. 49, No. 3 (Mar. 1984) p. 274-281.

* cited by examiner

METHOD AND APPARATUS FOR AZIMUTHAL LOGGING OF SHEAR WAVES IN BOREHOLES USING OPTIONALLY ROTATABLE TRANSMITTER AND RECEIVER ASSEMBLIES

This invention is related to measurements of properties of material penetrated by a well borehole, and more particularly toward determination of material properties of interest from measures of shear wave properties as a function of azimuth using optionally rotatable acoustic transducer and receiver assemblies.

BACKGROUND OF THE INVENTION

Knowledge of azimuthal stress distribution of earth formation penetrated by a well borehole is useful in optimizing a variety of hydrocarbon exploration, development and production operations. As an example, knowledge of the azimuthal direction of minimum and maximum stress is useful in optimizing the orientation of horizontal well boreholes for maximum hydrocarbon production. In fractured formations, minimum formation stress is parallel to the direction of fracturing. Optimal drainage of fractured formations is obtained at an azimuthal direction parallel to the direction of fracturing.

Borehole televiewer systems can sometimes be used to optically "view" fractures intersecting a borehole. Optical borehole televiewer systems can only "see" fractures that intersect the borehole wall. Optical viewing of the borehole wall is often obliterated by wellbore fluids, by mudcake buildup on the wall of the borehole, or by other conditions that perturb optical imaging in the drilling, completion and production of a well borehole. Acoustic televiewers can penetrate some materials that render optical televiewers ineffective or useless. Acoustic borehole televiewers, which operate at relatively high frequencies, exhibit a relatively shallow radial depth of investigation into the formation. Fracturing can again be masked by intervening material between the acoustic borehole televiewer and the virgin earth formation penetrated by the borehole.

Full wave acoustic logging tools, typically comprising a plurality of axially and radially spaced transmitters and receivers, are used to determine shear wave energy distribution around a borehole. Typically at least two dipole transmitters, commonly referred to as an X-transmitter and a Y-transmitter, are oriented at 90 degrees and in a plane perpendicular to the axis of the well borehole. A plurality of receivers, each receiver typically comprising four receiver elements at the same orthogonal orientation as the transmitters, are axially spaced at predetermined distances or "stations" from the transmitters. Each receiver element in each receiver station is preferably oriented to receive a signal from either the X-transmitter or the Y-transmitter. Azimuthal shear wave energy distribution around the borehole can be obtained by combining and analyzing receiver element responses for shear wave velocity and shear wave amplitude.

In the prior art, it is typically assumed that the formation stress distribution around the borehole exhibits a minimum and a maximum that are perpendicular to each other. This assumption is, in general, not valid since it is common to encounter formations in which minimum and maximum stresses are not oriented at ninety degrees from each other. Shear wave velocity and shear wave amplitude can be used to determine stress patterns and, therefore, can be used to determine the direction of fracturing in anisotropic formations. The azimuthal variation of the shear wave parameters as a function of azimuthal stress patterns is relatively small. In order to obtain meaningful measurements, both transmitter and receiver elements must be accurately calibrated prior to a logging operation. Furthermore, calibration and "balance" between elements must be maintained while logging in a typically harsh borehole environment. Calibration and the maintaining of calibration and balance during logging are chronic problems in current full wave acoustic logging systems.

SUMMARY OF THE INVENTION

This disclosure is directed toward an acoustic logging system with a borehole tool comprising a transmitter assembly and an axially spaced receiver assembly. The transmitter and receiver assemblies are optionally rotatable with respect to each other, depending upon the embodiment of the logging system. The logging system is designed to measure, among other parameters, the velocity (or slowness) and amplitude of shear wave energy induced by the transmitter assembly within the formation penetrated by the borehole. These parameters are extracted from full wave acoustic data responses of receiver elements comprising the receivers of the receiver assembly, and are measured as a function of azimuth around the borehole. These parameters are subsequently used to determine anisotropic properties of the formation, such as the azimuthal direction of the maximum stress or the direction of formation fracturing with respect to the well borehole In one embodiment of the logging system, the transmitter assembly comprises a transmitter comprising a single dipole transmitter element. The use of a single rotating transmitter element eliminates the need for balancing and calibration between transmitters. In addition, the use of a single rotating transmitter element eliminates the need to collocate signals from multiple, axially spaced transmitter elements to a common reference depth within the borehole. Prior art collocation methods include, but are not limited to, software collocation. Elimination of the need to collocate transmitter signals improves accuracy in the determination of the anisotropy formation properties since all azimuth measurements in a given rotation are taken essentially at the same reference depth. The receiver assembly comprises at least two receivers axially spaced at different spacings from the transmitter assembly. Each receiver of the receiver assembly comprises a single receiver element that is radially aligned with the transmitter element. Both the transmitter and receiver assemblies are synchronously rotated about the axis of the tool thereby maintaining alignment between the transmitter element and the receiver elements. Acoustic energy is transmitted as pulses into the formation as the transmitter assembly rotates. The single transmitter element transmits the same amount of acoustic energy at every predetermined azimuthal position around the borehole. This eliminates the need to maintain calibration and balance of multiple transmitter elements, while logging, in the transmitter assembly. Full wave acoustic data are recorded by each single, synchronously rotating receiver element comprising each receiver of the receiver array. For each receiver, the same receiver element measures acoustic energy at every azimuthal orientation. This eliminates the need to maintain calibration and balance of multiple, azimuthally spaced receiver elements at a given axially spaced receiver. Shear wave velocities and amplitudes are determined from the response of each receiver element at each azimuthal orientation. These parameters are then combined and used to obtain borehole anisotropy parameters of interest.

Embodied as described above, the logging system uses measured energy and velocity distribution in the formation around the borehole to identify the stress field distribution with respect to a reference azimuth, which is preferably magnetic north. The maximum and the minimum of the stress field distribution are not necessary perpendicular to each other. In the same manner, the velocity distribution of the formation around the borehole will identify the slow and fast shear velocity angles reference preferably to the magnetic north. As with stress field maxima and minima, slow and fast shear velocities are not necessary perpendicular to each other. This embodiment of the logging system eliminates the need for mathematical algorithms to determine the anisotropy parameters of the formation around the circumference of the borehole. By definition, the distribution of shear wave energy at each azimuthal orientation around the borehole defines the orientation of the minima and the maxima of the stress field. In the same manner, the distribution of shear wave velocity at each azimuthal orientation defines, by definition, the orientation of the slow and fast shear velocities. As mentioned above, the formation can exhibit non-orthogonal anisotropy wherein slow and fast shear velocities, along with stress field maxima and minima, are not necessary perpendicular.

It is noted that the above embodiment of the logging system can acquire signals containing parameters to determine the anisotropy properties of the formation at any desire number of azimuthal orientations In another embodiment of the logging system, the transmitter assembly again comprises a single dipole transmitter element. The receiver assembly comprises an array of at least two receivers at differing axial spacings from the transmitter assembly. Each receiver in the receiver array comprises a plurality of receiver elements that are azimuthally disposed around the axis of the tool in a plane perpendicular to the axis and at preferably equal angular spacings. In this embodiment, the transmitter assembly is rotated about the axis of the tool. Acoustic energy is again transmitted as pulses into the formation as the transmitter assembly rotates. The single transmitter element transmits the same amount of acoustic energy at every predetermined azimuthal position around the borehole. Once again, this eliminates the need to maintain calibration or balance between multiple transmitter elements, while logging, in the transmitter assembly. In addition, this embodiment eliminates the need for software transmitter collocation to a single reference depth level since all the signals are essentially broadcast from a single transmitter at one depth level per revolution. In this embodiment, the receiver assembly is not rotated about the axis of the tool. Full wave acoustic data are recorded by each azimuthally disposed receiver element comprising each receiver of the receiver array. For each receiver, the multiple receiver elements measure acoustic energy at their corresponding azimuthal stations. Relative calibration of each axially spaced receiver comprising multiple, azimuthally spaced receiver elements must be retained in order to obtain accurate and precise measures of parameters of interest. Shear wave velocity and amplitude are determined from each receiver element response, and borehole anisotropy parameters of interest are determined by combining these parameters measured by each receiver element In yet another embodiment of the logging system, the transmitter assembly comprises two dipole transmitter elements disposed orthogonally in a plane perpendicular to the axis of the tool. The receiver assembly comprises an array of at least two receivers axially spaced at differing spacings from the transmitter assembly. Each receiver comprises a single receiver element. The transmitter assembly does not rotate about the axis of the logging tool. Acoustic energy is transmitted as pulses at a 90 degree angle by the two orthogonal transmitter elements. Calibration and balance between the two transmitter elements must be obtained in order to obtain accurate and precise measures of the parameters of interest. The receiver assembly is rotated about the axis of the tool. Once again, full wave acoustic data are recorded by each single rotating receiver element comprising each receiver of the receiver array. For each receiver, the same receiver element measures acoustic energy at every azimuthal direction. This, as discussed previously, eliminates the need to maintain calibration and balance of multiple, azimuthally spaced receiver elements comprising a given axially spaced receiver. Again, shear wave velocity and amplitude are determined, and borehole anisotropy parameters are obtained by combining responses of the receiver elements.

In still another embodiment of the logging system, the transmitter assembly comprises a single dipole transmitter element and the receiver array comprises at least two receivers axially spaced at differing spacings from the transmitter assembly. Each receiver comprises a single receiver element that is radially aligned with the transmitter element. Both the transmitter and receiver arrays are periodically and synchronously oscillated about the axis of the tool while maintaining alignment between the transmitter element and the at least two receiver elements. Oscillation, rather than rotation, eliminates certain electromechanical elements in the system, as will be discussed in a subsequent section of this disclosure. Acoustic energy is again transmitted as pulses into the formation as the transmitter element oscillate. The single transmitter element transmits the same amount of acoustic energy at every location of an oscillatory arc. This, as in the rotating transmitter embodiments, eliminates the need to maintain calibration and balance between multiple transmitter elements. Full wave acoustic data are recorded by each single, synchronously oscillating receiver element comprising each receiver of the receiver array. For each receiver, the same receiver element measures acoustic energy at every azimuthal station, again eliminating the need to maintain relative receiver calibration and balance. Previously discussed shear wave related parameters of interest are determined by combining receiver element responses at predetermined azimuthal positions on the swept arc.

BRIEF DESCRIPTION OF THE DRAWINGS

So that the manner in which the above recited features, advantages and objects the present invention are obtained and can be understood in detail, more particular description of the invention, briefly summarized above, may be had by reference to the embodiments thereof which are illustrated in the appended drawings

DETAILED DESCRIPTION OF THE PREFERRED EMBODIMENTS

The acoustic logging system comprises a downhole tool comprising a dipole transmitter assembly and an axially spaced dipole receiver assembly. The transmitter and receiver assemblies are optionally rotatable with respect to each other at a predetermined rotation rate, depending upon the embodiment of the system. Parameters of interest are determined by processing and combining full wave acoustic data responses of elements comprising the receiver assembly. These parameters are subsequently used to determine anisotropic properties of the formation, such as the direction of formation fracturing with respect to the well borehole.

Nomenclature

In this disclosure, the term "transmitter element" is a single dipole transducer that, upon activation, generates a pulse of acoustic energy. The term "transmitter array" encompasses all transmitter elements disposed in the logging tool. The term "transmitter assembly" encompasses the transmission array and certain operational, structural and control elements not included in the transmitter electronics section of the tool. The term "receiver element" is a single transducer element capable of responding to acoustic energy emitted by elements of the transmitter assembly. The term "receiver" encompasses one or more receiver elements displaced at the same axial spacing from the transmitter assembly. The term "receiver array" encompasses a plurality of receivers disposed at different axial spacings from the transmitter assembly. The term "receiver assembly" encompasses the receiver array and certain operational, structural and control elements not included in the receiver electronics section of the tool.

Elements of the System

Figure 1:
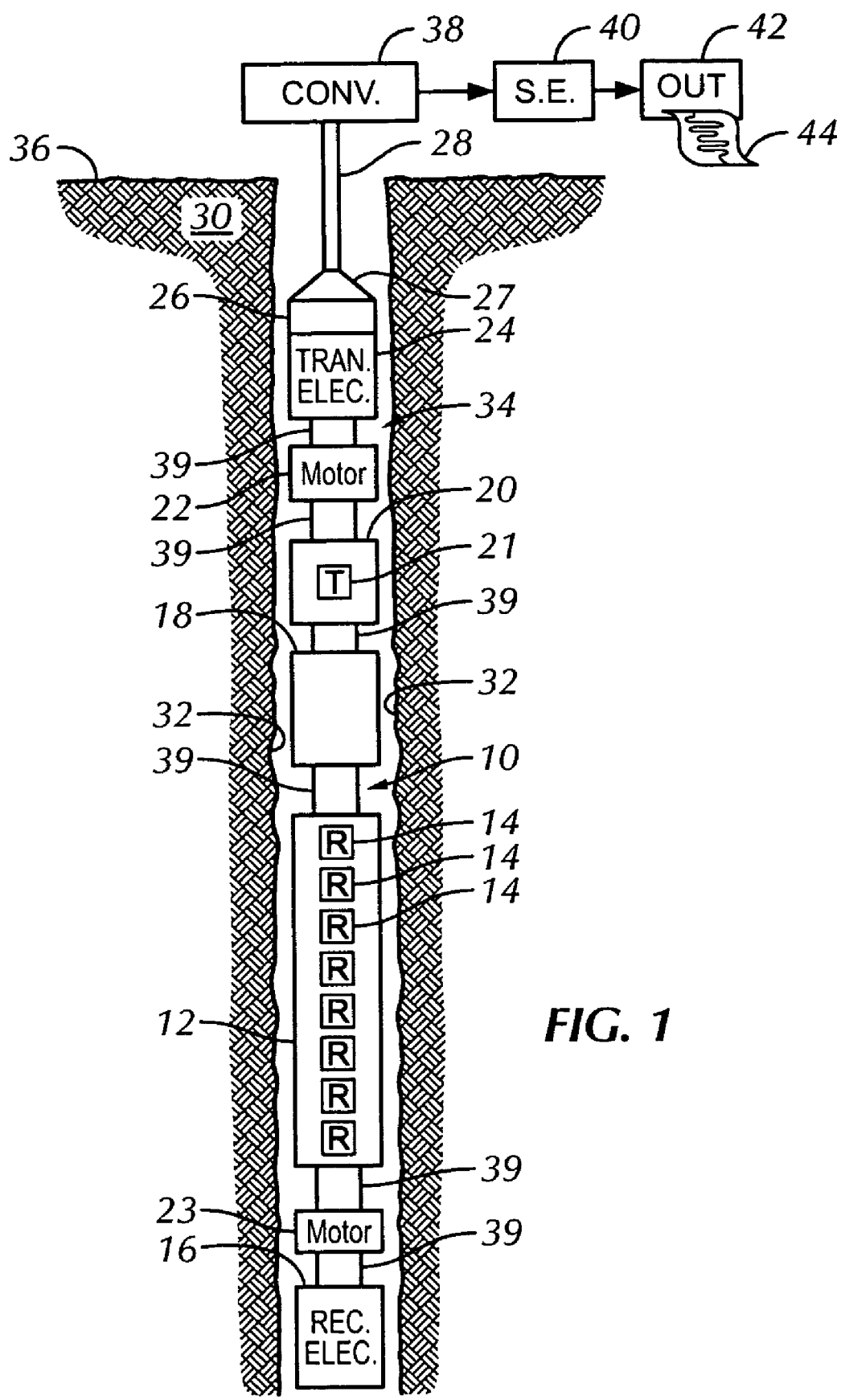
FIG. 1 is a conceptual illustration of elements of the logging system with a logging tool disposed in a well borehole.

FIG. 1 is a conceptual illustration of major elements of the logging system showing a logging tool 10 disposed in a well borehole 34 penetrating earth formation 30. The logging tool 10 comprises a transmitter assembly 20, which comprises a transmitter array of at least one dipole transmitter element 21. The dipole transmitter elements can be fabricated from one or more bender bars or piezoelectric crystals. Other types of transmitter elements can be used. Each transmitter element 21 is pulsed preferably at about 200 millisecond (msec) intervals, and at an operating frequency preferably ranging from about 1.0 kilohertz (kHz) to about 5.0 kHz. Acquisition time of each pulse is in the range of 20 msec to 40 msec, depending upon the acoustic characteristics of the earth formation 30, and the mechanical characteristics of the logging tool. Power and timing for the transmitter elements 21 of the transmitter assembly 20 are provided by a transmitter electronics subsection 24 of the tool 10.

Still referring to FIG. 1, a receiver assembly 12 comprises an array of receivers comprising at least two receivers at different axial spacings from the transmitter assembly 20. Each receiver comprises at least one receiver element 14. An array of receivers comprising eight receivers is shown in FIG. 1, with each receiver comprising a single receiver element 14. Multiple receiver arrays are used to optimize depth of investigation in formations with varying acoustic propagation properties, to determine radial variation or transverse anisotropy of the formation, to correct for borehole effects, and to obtain enhanced shear wave velocity and amplitude measurements. Receiver elements 14 are preferably dipole transducers fabricated from one or more piezoelectric crystals. Each receiver element 14 responds to a full acoustic wave packet induced by the transmitter assembly 20. The form, components, properties and characteristics of these wave packets are presented in "Continuous Acoustic Shear Wave Logging", J. Zemanek et al, SPWLA 25th Annual Logging Symposium, Jun. 10-13, 1984, Paper U and "Compressional and Shear Arrivals in a Multiple Sonic Log", G. A. Winbow, Geophysics V. 50, No. 7, 1119-1126, which are entered into this disclosure by reference. Power and operation control from the receiver elements 14 are provided by a receiver electronics subsection 16 of the tool 10. Analog full waveform responses of the receiver elements 14 are preferably digitized in the receiver electronics subsection 16 and telemetered to the surface 36 of the earth via a telemetry system 26 for full wave processing preferably in surface equipment 40. Digitized responses from each receiver element 14 are combined in a processor (not shown) preferably within the surface equipment 40 using a semblance processing or other suitable processing methodology to determining shear wave velocity $v_s$ and shear wave amplitude $A_s$. Details of full wave processing methodology are presented in "Semblance Processing of Borehole Acoustic Array Data", C. V. Kimball et al, Geophysics, V. 49, No. 3, 274-281, which is entered into this disclosure by reference.

Once again referring to FIG. 1, the transmitter assembly 20 and the receiver assembly 12 are separated by an acoustic isolator subsection 18. A data conduit is operationally connected at a lower end to the logging tool 10 by means of a suitable connector 27. The upper end of the data conduit is operationally connected to a conveyance means 39, which in turn is operationally connected to the surface equipment 40. If the logging system is embodied as a wireline system, the data conduit 28 is a wireline cable. The conveyance means 38 is a wireline draw works assembly comprising a winch, winch motor and a suitable surface suitable slip ring assembly through which digitized full wave data are passed to the surface equipment 40. If the logging system is embodied for tubing conveyed operations, the data conduit 28 is coiled tubing (preferably with electrical or optical conductors embedded in the wall), and the conveyance means 38 is a coiled tubing injector unit operationally connected to the surface equipment 40. Once the full wave data are processed, parameters of interest are typically recorded as a function of borehole depth at which they are measured, and output as a "log" 44 via a suitable output recording means 42.

The logging system can alternately be embodied as a "pumpdown" system. In this embodiment, receiver data must be stored within the logging tool 10 and subsequently retrieved at the surface 36 for processing.

Again referring to FIG. 1, the transmitter assembly 20 can be optionally rotated about the axis of the tool 10 by a transmitter motor 22. The receiver assembly can be optionally rotated about the axis of the tool 10 by a receiver motor 23. Rotation of these elements will be discussed in detail in subsequent sections of this disclosure. It is noted that all previously discussed elements of the tool 10 are operationally connected through suitable joints, which are represented conceptually at 39 in FIG. 1. These joints 39 can be "fixed" or "swivel" depending upon the embodiment of the invention. One or more joints 39 can comprise slip rings if the transmitter assembly, the receiver assembly, or both the transmitter and receiver assemblies are rotated through full 360 degree angles, as will be discussed in detail in subsequent sections of this disclosure.

Embodiments

Figure 2:
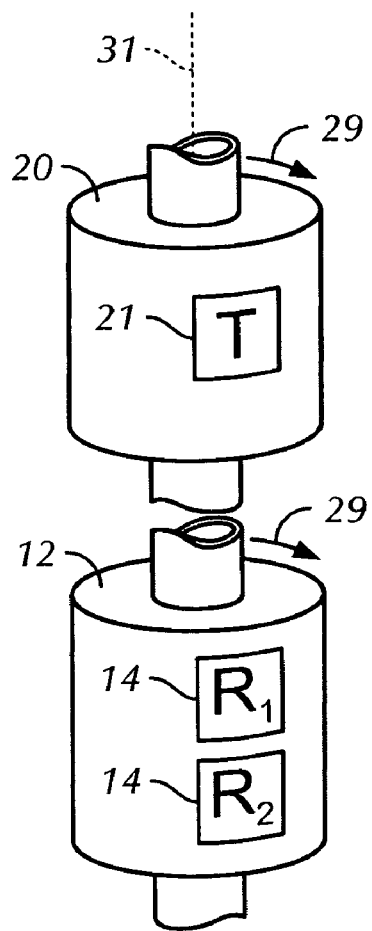
FIG. 2 illustrates an embodiment of the logging system in which both transmitter and receiver assemblies are rotated about the logging tool.

FIG. 2 illustrates conceptually a first embodiment of the logging system. Many of the elements shown in FIG. 1 have been omitted for reasons of clarity and brevity. The transmitter array of the transmitter assembly 20 comprises a single dipole transmitter element 21. The receiver array of the receiver assembly 12 is illustrated with two receivers axially spaced at differing spacings from the transmitter assembly 20. Each receiver comprises a single receiver element 14 denoted as $R_1$ and $R_2$. As discussed previously, eight receivers are preferred, but the two receivers illustrated in FIG. 2 are sufficient to clearly illustrate the embodiment. Each receiver element 14 of the receiver array is shown radially aligned with the transmitter element 21. The transmitter assembly 20 is rotated through 360 degrees about the major axis 31 of the tool by the transmitter motor 22 (see FIG. 1), as illustrated conceptually by the arrow 29. The receiver assembly is rotated through 360 degrees about the major axis 31 of the tool 10 by the transmitter motor 23 (see FIG. 1), as illustrated conceptually by the arrow 27. Rotation is synchronous thereby maintaining radial alignment between the transmitter element 21 and the two receiver elements 14. The preferred rotation rate is about one rotation per second. As discussed previously, acoustic energy is transmitted as pulses into the formation as the transmitter element 14 rotates through a full 360 degrees. Since the single transmitter element transmits the same amount of acoustic energy at every predetermined azimuthal position around the circumference of the borehole, the need to maintain calibration or balance of transmitter elements is eliminated. As discussed previously, the single rotating transmitter element eliminates the need for software collocation when multiple X and Y transmitters are used at separate positions along the logging tool, improving the accuracy of the calculation of the anisotropy properties of the formation. Full wave acoustic data are recorded by each single, synchronously rotating receiver element 14. For each receiver in the receiver assembly 12, the same receiver element 14 measures acoustic energy at every azimuthal station. This eliminates the need to maintain calibration and balance of a receiver comprising multiple, azimuthally spaced receiver elements at a given axially spaced receiver. Full waveforms from the receiver elements 14 are digitized preferably in the receiver electronics section 16, and telemetered to the surface equipment 40 via the telemetry system 26 and data conduit 28. Shear wave velocity $v_s$ and amplitude $A_s$ are determined by combining responses of the receiver elements 14 in the surface equipment 40, and borehole anisotropy parameters of interest are determined from these measurements and preferably recorded as a function of borehole depth in the output unit 42 as a log 44. The number of azimuthal positions can be selected to obtain the desired accuracy and circumferential resolution of the stress and velocity field around the circumference of the borehole. The preferred number is 32 equally spaced azimuthal positions per revolution. By addressing transmitter and receiver calibration, balance, and collocation requirements, and by selection of an appropriate number of azimuthal positions per rotation, processing algorithms used to determine the angular orientation of anisotropy qualities are substantially simplified.

Several methods can be used to obtain synchronous rotation of the transmitter assembly 20 and the receiver assembly 12. Both transmitter and receiver motors 23 and 22, respectively, can be operated at the same rate and in the same rotational direction. The joints 39 above the transmitter motor 39 and above the receiver assembly 12 are swivel joints comprising slip rings. Joints 39 above the isolation subsection 18 and below the receiver assembly 12 are fixed. Using another method, the receiver motor 23 is disengaged or optionally removed from the tool 10, joints 39 below the transmitter assembly 20 are fixed, and the joint 39 above the transmitter motor 22 is a swivel joint comprising slip rings. Using yet another method, the receiver motor 23 is activated, the transmitter motor 22 is disengaged or optionally removed, the joint 39 immediately above the transmitter assembly is a swivel joint comprising slip rings, and the joints 39 below the transmitter assembly 20 are fixed.

Another embodiment of the invention is illustrated conceptually in FIG. 3, again with many of the tool elements omitted for clarity and brevity. The receiver assembly 12, as shown, comprises two receivers at differing spacings from the transmitter assembly 20. As discussed previously, additional axially spaced receivers are preferred. Each receiver comprises plurality of receiver elements 14a and 14b that are azimuthally disposed in a plane perpendicular to the major axis 31 of the tool and at preferably equal radial spacings. The transmitter assembly 20 comprises a single transmitter assembly 21. In this embodiment, the transmitter assembly 20 is rotated through 360 degrees about the major axis 31 of the tool 10, as illustrated conceptually by the arrow 29. Acoustic energy is again transmitted as pulses into the formation as the transmitter assembly 20 rotates. As in the embodiment shown in FIG. 2, the single transmitter element 21 transmits the same amount of acoustic energy at every predetermined azimuthal position around the borehole. Once again, this eliminates the need to maintain calibration or balance multiple transmitter elements, while logging, in the transmitter assembly 20. Furthermore, the single rotating transmitter element again eliminates the need for software collocation when multiple X and Y transmitters are used at separate axial positions along the logging tool, improving the accuracy of the calculation of the anisotropy properties of the formation. In this embodiment, the receiver assembly 12 is not rotated about the major axis 31 of the tool. Full wave acoustic data are recorded by each azimuthally disposed receiver element 14a, 14b comprising each receiver of the receiver array. For each receiver, the multiple receiver elements 14a, 14b measure acoustic energy at their corresponding azimuthal stations. Relative calibration of each axially spaced receiver comprising multiple, azimuthally spaced receiver elements 14a, 14b must be retained in order to obtain accurate and precise measures of parameters of interest. Shear wave velocity $v_s$ and amplitude $A_s$ are determined by full wave processing and combining responses of all receiver elements 14a, 14b of all receivers, and borehole anisotropy parameters of interest are determined from these measurements.

Figure 3:
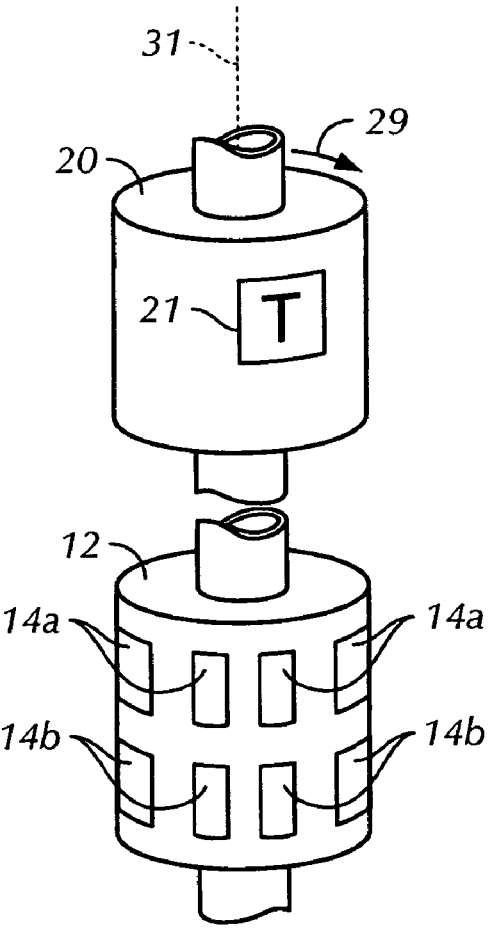
FIG. 3 illustrates an embodiment of the tool in which the transmitter assembly is rotated about the axis of the logging tool, and the receiver assembly is stationary with respect to a predetermined rotational rate of the transmitter assembly.

Referring to both FIGS. 1 and 3, The relative rotation of transmitter assembly 20 at a predetermined rate with respect to the receiver assembly 12 can be obtained using several optional methods. The transmitter motor 22 can be activated and thereby optionally rotate the transmitter assembly 20 at the predetermined rate. The joints 39 immediately below the transmitter assembly 20 and/or immediately below the isolation subsection 18 function as swivel joints. With the receiver motor 23 deactivated or alternately removed from the tool 10, the receiver assembly 12 will remain stationary with respect to the rotating transmitter assembly 20. Alternately, both the transmitter motor 22 and the receiver motor 23 can be activated to rotate in opposite directions and each at one half of the predetermined rotation rate. This methodology will yield the desired rotation rate of the transmitter assembly 20 with respect to the receiver assembly 12. Using any methodology to obtain the desired rotation, at least two joints 39 must contain a slip ring assembly or the like to maintain the desired electrical connection during operation. It should be understood that there are still additional options and joint configurations that can be used to obtain the desired relative rotation between the transmitter assembly 21 and the receiver assembly 12.

Figure 4:
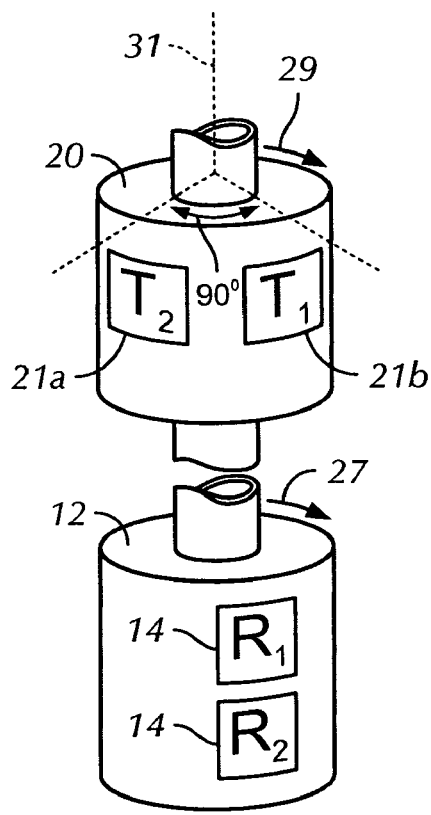
FIG. 4 illustrates an embodiment of the logging tool in which the receiver assembly is rotated about the axis of the tool, and the transmitter assembly is stationary with respect to a predetermined rotation rate of the receiver assembly.

Yet another embodiment of the logging system is illustrated conceptually in FIG. 4. The transmitter assembly 20 comprises a transmitter comprising two dipole transmitter elements 21a and 21b disposed preferably orthogonally in a plane perpendicular to the major axis 31 of the tool. The receiver assembly 12 is again shown with only two receivers axially spaced at differing spacings from the transmitter assembly 20, although additional receivers are preferred. Each receiver comprises a single receiver element 14. The transmitter assembly 20 does not rotate about the major axis 31 of the logging tool. Dipole acoustic energy is transmitted as pulses at preferably a 90 degree angle by the two orthogonal transmitter elements 21a and 21b. Calibration and balance between the two transmitter elements 21a, 21b must be obtained in order to obtain accurate and precise measures of the parameters of interest. The receiver assembly 12 is rotated through 360 degrees about the major axis 31 of the tool with respect to the transmitter assembly 20, as illustrated conceptually by the arrow 27. Fully wave acoustic data are recorded by each single rotating receiver element 14 comprising each receiver of the receiver assembly 12. For each receiver, the same receiver element 14 measures acoustic energy at every azimuthal station. The preferred number of azimuthal stations is 360 per rotation. This, as discussed previously, eliminates the need to maintain calibration and balance of a receiver comprising multiple, azimuthally spaced receiver elements at a given axially spaced receiver. Shear wave velocity $v_s$ and amplitude $A_s$ are determined by full wave processing and combining responses of all receiver elements 14 of all receivers, and borehole anisotropy parameters of interest are determined from these measurements.

As in the previous embodiment, the rotation of the receiver assembly 12 with respect to the transmitter assembly 20 can be obtained using several optional methods. Referring to both FIGS. 1 and 4. The transmitter motor 22 is deactivated or even removed from the tool 10, and the receiver motor 23 is activated to rotate the receiver assembly at a predetermined rate. Joints 39 immediately above and below the isolation subsection 18 act as swivel joints. In view of discussion of previous embodiments, it should be understood that optional methodology can be used to obtained the desired relative rotation between the transmitter assembly 20 and the receiver assembly 12. As in the previously discussed embodiments, any methodology used to obtain the desired rotation requires at least one joint 39 comprising a slip ring assembly or the like to maintain the desired operational connection to the surface equipment 40.

Figure 5:
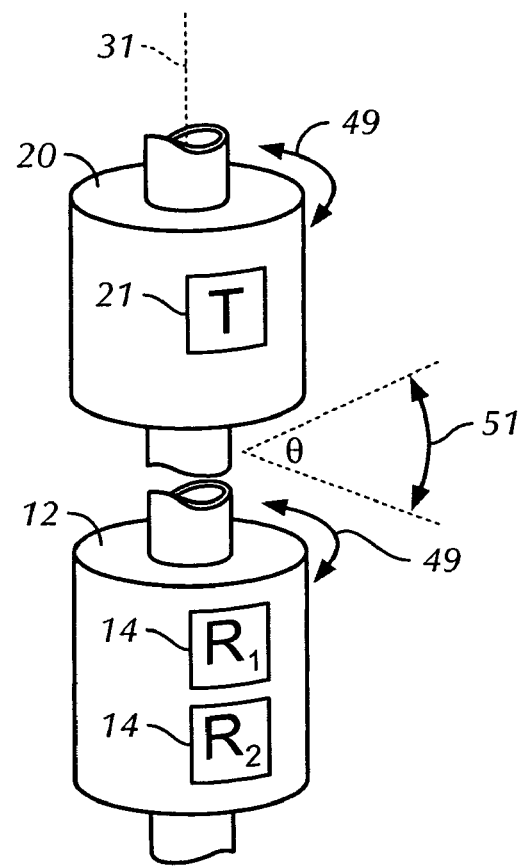
FIG. 5 illustrates an embodiment of the tool in which both transmitter and receiver assemblies are synchronously oscillated in an arc about the axis of the tool.

FIG. 5 conceptually illustrates still another embodiment of the logging system. As in the embodiment shown in FIG. 2, the transmitter assembly 20 comprises a single dipole transmitter element 21, and the receiver assembly 12 comprises at least two receivers axially spaced at differing spacings from the transmitter array. Each receiver comprises a single receiver element 14 that is radially aligned with the transmitter element 21. Both the transmitter and receiver assemblies 20 and 12 are periodically and synchronously rotated as an oscillation about the major axis 31 of the tool, as illustrated conceptually by the arrow 49. Radial alignment is maintained between the transmitter element 21 and the at least two receiver elements 14. Oscillation of the transmitter and receiver assemblies, rather than full 360 degree rotation as in previous embodiments, eliminates the need for a slip ring assembly or the like in any of the joints 39. This results in reduced manufacture and maintenance costs of the logging system. Acoustic energy is again transmitted as pulses into the formation by the dipole transmitter element 21 as the transmitter assembly 20 oscillates. The single dipole transmitter element 21 transmits the same amount of acoustic energy at every location of the oscillatory arc. This, as in previously discussed 360 degree rotating transmitter assembly embodiments, eliminates the need to maintain calibration and balance between multiple transmitter elements. The single oscillating transmitter element eliminates the need for software collocation or the like that is required in prior art systems comprising multiple X and Y transmitters disposed at separate axial positions along the logging tool. Each axially spaced receiver of the receiver assembly 12 comprises a single receiver element 14. Full wave acoustic data are recorded by each single, synchronously oscillating receiver element 14 comprising each receiver of the receiver assembly 12. For each receiver, the same receiver element 14 measures acoustic energy at every azimuthal station, again eliminating the need to maintain relative receiver element calibration and balance. The number of azimuthal positions within the oscillating arc can be selected to obtain the desired accuracy and the circumferential resolution of the stress and velocity field around the circumference of the borehole. Azimuthal positions at 1 degree radial spacings are preferred. As in previous embodiments and especially the embodiment illustrated in FIG. 2, transmitter and receiver calibration, balance, and collocation requirements are essentially eliminated. Processing algorithms used in the determination of the angular orientation of anisotropy qualities are, therefore, substantially simplified.

Referring to FIGS. 1 and 5, either the transmitter motor 22 or the receiver motor 23 can be disengaged or optionally removed from the tool 10. If the receiver motor 23 is disengaged or optionally removed, all joints 39 below the transmitter assembly 20 are fixed and the joint immediately above the motor 22 is a swivel joint. The transmitter motor 22 is then operated in an oscillating mode. If the transmitter motor 22 is disengaged or optionally removed, the joint above the transmitter assembly is a swivel joint, and all joints 39 below the transmitter assembly 20 are fixed. A 180 degree oscillation arc adequately defines borehole anisotropy since, in practice, opposing sides of the dipole energy propagated by the formation are typically mirror images. The transmitter motor 22 (or alternately the receiver motor 23) is, therefore, programmed to oscillate at an angle $+/-\theta$, which is shown at 51 and is preferably 90 for reasons previously discussed. Previously discussed shear wave related parameters of interest are determined by combining receiver element responses at predetermined azimuthal positions on the swept arc.

In view of the discussion of the various embodiments of the logging system, it is apparent that the transmitter assembly 20 and the receiver assembly 12 are optionally rotatable. This optional rotation is obtained by the activation of the transmitter motor 20 and the receiver motor 23. These motors can be activated (or deactivated) prior to logging, by predetermined signals from a processor (not shown) within the logging tool, or by commands from the surface transmitted via a downlink of the telemetry system 26.

Results

The reference "Semblance Processing of Borehole Acoustic Array Data", which was previously incorporated into this disclosure by reference, provides one means for obtaining shear wave velocity $v_s$ and shear wave amplitude $A_s$ from acoustic waveforms recorded by each receiver element. Responses from all receiver elements are combined to maximize accuracy and precision of these measured parameters.

Figure 6:
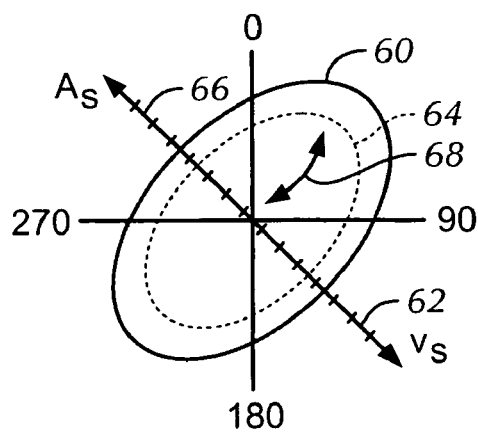
FIG. 6 illustrates measures of shear wave velocity and shear wave amplitude obtained from the response of the logging tool at a specific depth within a well borehole

FIG. 6 illustrates polar plots of the shear wave velocity $v_s$ and shear wave amplitude $A_s$ as a function of azimuth at a specific depth in the well borehole. The "zero" azimuth is a reference direction, such as magnetic north. The solid curve 60 is amplitude $A_s$ as a function of borehole azimuth, and the broken curve 64 is velocity $v_s$ as a function of borehole azimuth. It is noted that in the example shown in FIG. 6, maxima in both the $A_s$ and $v_s$ are shown at 45 degrees and 225 degrees. Using the reference 0 degrees as magnetic north, maxima in both curves occur in the northeast-southwest direction. Recall from previous discussion that maxima in $A_s$ and $v_s$ indicate azimuthal direction of minimum formation stress. Minimum formation stress, in turn, occurs in a direction parallel to the plane of formation fracturing. Results from the response of the logging system indicate, therefore, that at the measure depth, formation fracturing is in the northeast-southwest direction, as indicated by the arrow. 68.

It should be noted that the plots shown in FIG. 6 are exaggerated for purposed of illustration. Variation between maximum and minimum values of $A_s$ and $v_s$ are shown to be approximately 60 percent. In practice, variation is much smaller and is in the range of 5 to 25 percent. This relatively small "signal" illustrates the need to optimize accuracy and precision of the measures of parameters of interest.

It is again noted that by definition, the distribution of shear wave energy at each azimuthal orientation around the borehole defines the orientation of the minima and the maxima of the stress field. In the same manner, the distribution of shear wave velocity at each azimuthal orientation defines, by definition, the orientation of the slow and fast shear velocities. The formation can exhibit non-orthogonal anisotropy wherein slow and fast shear velocities, along with stress field maxima and minima, not necessary perpendicular.

As mentioned above, FIG. 6 is a measure at a specific depth within the borehole. Typically, measurements are made continuously as the tool 10 is conveyed along the borehole 34 thereby yielding a log 44 of parameters of interest as a function of depth.

A knowledge of azimuthal stress of earth formation penetrated by a well borehole is useful in optimizing a variety of hydrocarbon exploration, development and production operations. As an example, a knowledge of the azimuthal direction of minimum stress is useful in optimizing the orientation of horizontal well boreholes for maximum hydrocarbon production. In fractured formations, minimum formation stress is parallel to the direction of fracturing. Optimal drainage of fractured formations is obtained at an azimuthal direction parallel to the direction of fracturing One skilled in the art will appreciate that the present invention can be practiced by other than the described embodiments, which are presented for purposes of illustration and not limitation, and the present invention is limited only by the claims that follow.

What is claimed is:

1. A logging tool for operation in a borehole penetrating a formation, said logging tool comprising:
   (a) a transmitter assembly rotatable while logging by a cooperating transmitter motor and comprising at least one dipole transmitter element; and
   (b) a receiver assembly rotatable while logging by a cooperating receiver motor and axially spaced from said transmitter assembly and comprising at least two receivers with each receiver comprising at least one receiver element; wherein
   (c) said transmitter assembly and said receiver assembly are rotatable about a major axis of said tool;
   (d) said transmitter assembly and said receiver assembly are synchronously rotated by said transmitter motor and by said receiver motor; and
   (e) responses of said receiver elements to shear acoustic energy are processed and combined to obtain a formation parameter of interest as a function of azimuth.

2. The tool of claim 1 wherein:
   (a) said transmitter assembly comprises a single dipole transmitter element; and
   (b) said receiver assembly comprises at least two receivers with each receiver comprising a single receiver element; and
   (c) said transmitter assembly and said receiver assembly are synchronously rotated through 360 degrees about said major axis of the tool with said transmitter element and said at least two receiver elements radially aligned.

3. The tool of claim 1 wherein:
   (a) said transmitter assembly comprises a single dipole transmitter element;
   (b) said receiver assembly comprises at least two receivers with each receiver comprising a single receiver element; and
   (c) said transmitter assembly and said receiver assembly are synchronously oscillated about said major axis of said tool with said transmitter element and said receiver elements radially aligned.

4. A method for determining as a function of azimuth an acoustic shear property in a formation penetrated by a borehole, the method comprising:
   (a) providing a logging tool for conveyance in said borehole;
   (b) disposing within said logging tool a transmitter assembly rotatable while logging by a transmitter motor and comprising at least one dipole transmitter element;
   (c) disposing within said logging tool a receiver assembly axially rotatable while logging by a receiver motor and spaced from said transmitter assembly and comprising at least at least two receivers with each receiver comprising at least one receiver element;
   (d) rotating synchronously said transmitter assembly with said transmitter motor and said receiver assembly; and
   (e) processing and combining responses of said receiver elements to shear acoustic energy to obtain said acoustic shear property as a function of azimuth.

5. The method of claim 4 wherein:
   (a) said transmitter assembly comprises a single dipole transmitter element;
   (b) said receiver assembly comprises at least two receivers with each receiver comprising a single receiver element; and
   (c) rotating said transmitter assembly and said receiver assembly through 360 degrees about said major axis of the tool with said transmitter element and said receiver elements radially aligned.

6. The method of claim 4 wherein:
   (a) said transmitter assembly comprises a single dipole transmitter element;
   (b) said receiver assembly comprises at least two receivers with each receiver comprising a single receiver element; and (c) oscillating said transmitter assembly and said receiver assembly about said major axis of the tool with said transmitter element and said receiver elements radially aligned.

7. A logging tool for operation in a borehole penetrating a formation, said logging tool comprising:
   a transmitter assembly comprising at least one dipole transmitter element; and
   a receiver assembly axially spaced from the transmitter assembly and comprising at least two receivers with each receiver comprising at least one receiver element; wherein
   the transmitter assembly and the receiver assembly are synchronously rotated about a major axis of the tool so as to allow responses of the receiver elements to shear acoustic energy to be processed and combined to obtain a formation parameter of interest as a function of azimuth.

8. The tool of claim 7 wherein:
   the transmitter assembly comprises a single dipole transmitter element;
   the receiver assembly comprises at least two receivers with each receiver comprising a single receiver element; and
   the transmitter assembly and said receiver assembly are rotated through 360 degrees about the major axis of the tool with the transmitter element and the at least two receiver elements radially aligned.

9. The tool of claim 7 wherein:
   the transmitter assembly comprises a single dipole transmitter element;
   the receiver assembly comprises at least two receivers with each receiver comprising a single receiver element; and
   the transmitter assembly and the receiver assembly are oscillated about the major axis of the tool with the transmitter element and the receiver elements radially aligned.

10. A method for determining as a function of azimuth an acoustic shear property in a formation penetrated by a borehole, the method comprising:
    providing a logging tool for conveyance in the borehole;
    disposing within the logging tool a transmitter assembly comprising at least one dipole transmitter element;
    disposing within said logging tool a receiver assembly spaced from the transmitter assembly and comprising at least at least two receivers with each receiver comprising at least one receiver element;
    synchronously rotating the transmitter assembly and the receiver assembly about a major axis of the tool; and
    processing and combining responses of the receiver elements to shear acoustic energy to obtain the acoustic shear property as a function of azimuth.

11. The method of claim 10 wherein:
    the transmitter assembly comprises a single dipole transmitter element;
    the receiver assembly comprises at least two receivers with each receiver comprising a single receiver element; and
    synchronously rotating the transmitter assembly and the receiver assembly comprises rotating the transmitter assembly with a transmitter motor and the receiver assembly with a receiver motor through 360 degrees about the major axis of the tool with the transmitter element and the receiver elements radially aligned.

12. The method of claim 10 wherein:
    the transmitter assembly comprises a single dipole transmitter element;
    the receiver assembly comprises at least two receivers with each receiver comprising a single receiver element; and
    synchronously rotating the transmitter assembly and the receiver assembly comprises oscillating the transmitter assembly with a transmitter motor and the receiver assembly with a receiver motor about the major axis of the tool with the transmitter element and the receiver elements radially aligned.

* * * * *